Feb. 14, 1961 G. D. WOODY 2,971,732
MIRROR BRACKET
Filed March 8, 1957
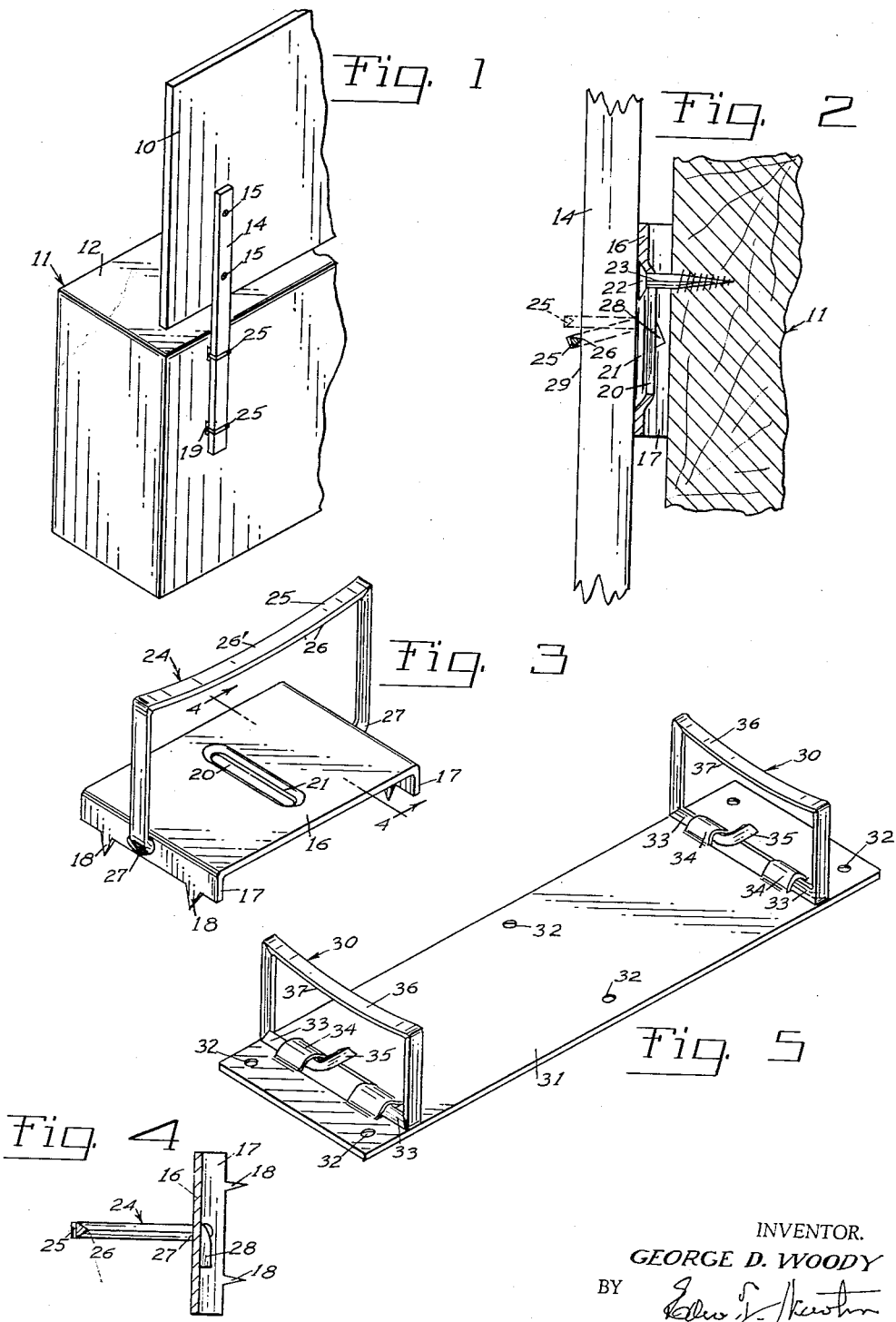
INVENTOR.
GEORGE D. WOODY
BY
ATTORNEY

United States Patent Office 2,971,732
Patented Feb. 14, 1961

2,971,732

MIRROR BRACKET

George D. Woody, 30 E. Club Drive NE., Atlanta, Ga.

Filed Mar. 8, 1957, Ser. No. 644,895

8 Claims. (Cl. 248—28)

This invention relates to brackets, and is particularly concerned with a novel, simple, effective and efficient bracket for use in retaining a mirror in vertical superposed relation with respect to a dresser, table or like article of furniture. It will of course be understood that other numerous and varied uses for the bracket of the present invention will be apparent to cabinet makers and others skilled in this art.

It has long been customary to mount mirrors in position over a dresser or table top by the use of vertical standards suitably secured to the back of the mirror and extending therefrom downwardly to be engaged with the back of a dresser, table or the like. Numerous and varied securing brackets by which the mirror may be engaged by the standards and/or the standard may be engaged with the back of the table or dresser have been devised. For the most part, such brackets have been complicated and fragile, frequently requiring threaded securement at each instance when the mirror is to be applied or removed. Furthermore, such devices rarely permit adjustment after the mirror is installed, and the brackets now on the market rarely meet the demands of economic manufacture.

It is therefore among the primary objects of the present invention to provide an improved bracket for use in securing a mirror standard to a mirror or dresser which is simple in construction, readily applied or removed, rugged and durable in operation and one which may be marketed at a low price.

Another object of the present invention is to provide a bracket for securing a mirror standard which may be permanently secured in position and which will permit release and/or adjustment of the standard as desired.

A further object of the present invention is to provide a bracket for securing a mirror standard which may be permanently secured in position and which will permit release and/or adjustment of the standard as desired.

A further object of the present invention is to provide a novel, simple and improved bracket for retaining a mirror standard which includes means for engaging a wooden mirror standard to penetrate the wood thereof so as to guard against inadvertent or accidental movement of the standard with respect to the bracket and/or its supporting member.

Numerous other objects, features and advantages of the invention will be apparent from consideration of the following specification taken in conjunction with the accompanying drawings.

While the present inventive concept may be carried out with a wide variety of structures and designs, it may generally be defined as including a body member which is to be attached to the back of a mirror or dresser, table, high-boy or like piece of furniture and which includes a movable engaging member having a biting edge adapted to penetrate the surface of a wooden mirror supporting standard to releasably retain the same. In the preferred forms of the invention, the biting member is a pivoted bridle which may have a limited pivotal movement in one direction so that as a mirror standard is extended therethrough the bridle will drop to the engaging position; however upon upward movement of the standard with respect thereto, the bridle will be retained in its full extended position to permit the free passage of the standard. While the inventive concept may be carried out by the use of a simple outwardly flat base pivotally mounting the bridle other forms of the invention may include guide means for the sides of the standards and spring means aiding to urge the standard in seated relation on the base surface.

In the drawings,

Fig. 1 is a fragmentary perspective view illustrating the manner of supporting the mirror standard from the back of a dresser by use of one form of the bracket of the present invention.

Fig. 2 is a detailed central vertical cross-sectional view illustrating the manner in which the bracket engages the standard and is secured to the mirror or dresser back.

Fig. 3 is a perspective view of that form of the bracket shown in Figs. 1 and 2.

Fig. 4 is a cross-sectional view taken on the line 4—4 of Fig. 3.

Fig. 5 is a perspective view of another form of the bracket.

Referring now to Fig. 1, it will be seen that the mirror which is to be supported vertically above the dresser is generally indicated by the numeral 10 and the dresser is indicated generally by the numeral 11, the numeral 12 being used to identify the horizontal top of the dresser, table or like article or furniture. The conventional mirror standard is indicated at 14 and comprises an elongate member generally rectangular in cross-section and preferably of wood or such soft material as to permit the surface to be impressed and engaged by the biting edge of the bridle of the bracket as hereinafter described. While the fragmentary view of Fig. 1 depicts only one standard, it will of course be understood that such standards are usually provided in pairs, one on each side of the rear of the mirror. Both such standards will of course be secured by the brackets of the present invention.

The upper portion of the standard 14 may be permanently secured to the back of the mirror by simple wood screws, as indicated at 15. In considering the present invention, it will be understood that the bracket here presented may be used for securing the upper end of the standard to the back of a mirror as well as for securing the lower end of the standard to the back of a dresser or like piece of furniture in the manner of Fig. 1. If desired, the bracket of the present invention may be used in both instances.

As seen more clearly in Figs. 2, 3, and 4, the bracket therein presented comprises a generally rectangular body piece 16 having depending side flanges 17 preferably provided with extending prongs 18 which permit the bracket body to be securely attached to the back of the dresser or like piece of furniture, as indicated at 19 in Fig. 1. To assist in permanent securement of the bracket, an elongate screw aperture 20 is provided surrounded by a depressed area 21 to receive the head 22 of a conventional wood screw 23. As indicated in Fig. 1, one or more such brackets may be suitably located in vertically spaced relation and permanently secured to the back of the dresser. As will be noted, the sides 17 will maintain the body piece 16 in spaced relation to the back of the dresser to accommodate the ends of the bridle as hereinafter mentioned.

For engaging and retaining the mirror standard 14, the bracket body 16 is provided with a pivoted, generally U-shaped, bridle 24, the transverse bit 25 of which, as more clearly indicated in Figs. 2 and 4, is formed with a sharp inner edge 26 which is adapted to engage and penetrate the soft wood surface of the standard 14 to firmly engage the standard to preclude accidental or inadvertent movement thereof with respect ot the bracket. While the biting edge 26 may be formed on the inner face of a bridle of round stock, as here shown the stock is preferably triangular in cross-section, the inner apex forming the edge 26. Rectangular or other forms providing a biting edge may be employed. As indicated at 26' the bit 25 is preferably bowed or curved inwardly towards the bracket so as to insure a firm contact of the biting edge at the center of the standard.

As shown in Fig. 2, with the bracket bridle in standard engaging position, the bridle is slightly inclined downwardly with the edge 26 biting into the standard at a point slightly below the central portion of the body of the bracket. The ends 27 of the bridle extend through the side walls 17 of the bracket body into the space provided by the walls 17. At least one end of the bridle thereof is turned as at 28 within the space to form a limit stop to preclude pivotal movement of the bridle upwardly beyond a horizontal position. In horizontal position it will be seen that the bridle bit section 25 is moved arcuately outward from the surface 29 of the standard 14 as indicated by broken lines in Fig. 2. Thus the standard 14 is disengaged from the biting edge 26, and the standard may be raised or lowered in order to remove the mirror from the dresser or adjust its vertical position. However, when the standard extends through the bridle and the bridle is released to drop by gravity to its inclined position, as shown by the full lines of Fig. 2, the edge 26 will engage the soft wood surface of the standard, biting into the surface to retain the standard in fixed relation with respect to the dresser. While a single bracket of the type shown in Figs. 2, 3, and 4 may be sufficient to adequately engage a standard, it is preferable in most instances to use two or more such brackets disposed in vertical spaced relation for each standard, as shown in Fig. 1.

In that form of the invention shown in Fig. 5, the bridles 30 are in the form of spaced parallel pairs mounted on a flat base 31 which may be secured to the back of the mirror and/or dresser through screw apertures 32. The bridles are pivotally secured by the extension of the in-turned ends 33 through retaining straps 34 pressed out from the material of the base 31. At least one terminal end 35 may be turned in a longitudinal direction to form a stop to preclude swinging motion upwardly beyond a horizontal position. As with the bridle bit 25, the bits 36 of the bridles 30 are formed with biting edges 37 to engage a standard in the manner of Fig. 2.

It will be seen from the foregoing that the present invention provides a novel, simple and improved bracket for releasably securing a mirror standard in position. The bracket may be secured on either the rear of the mirror or the dresser, or both, and as illustrated from the various species here presented, numerous changes, modifications and the full use of equivalents may be resorted to in the practice of the invention without departure from the spirit or scope thereof as defined in the appended claims.

I claim:

1. In a mirror and dresser system of the class wherein a standard extends vertically along the back of the dresser beyond the upper surface of the dresser and is fixed to the back of the mirror so as to support the mirror above the surface of the dresser, the combination therewith of a bracket aligned with said standard and fixed to the back of said dresser, said bracket comprising a base having a body, spaced parallel side flanges extending from opposite edges of said body in a plane about normal to the plane of said body, there being provided aligned apertures in said flanges, a substantially U-shaped bridle with a transverse bit engaging and retaining said standard between said base and said transverse bit, the ends of said bridle extending inwardly through said aligned apertures, and a limit stop on one of said ends of said bridle for precluding pivotal movement of said bridle upwardly beyond about a horizontal position.

2. In a mirror and dresser system of the class wherein a pair of spaced, wooden standards extends vertically along the back of the dresser beyond the upper surface of the dresser and is fixed to the back of the mirror at at least two spaced positions along the lengths of the standards, the standards being essentially rectangular in cross-section with their upper ends terminating at intermediate positions with respect to the back of the mirror so as to support the mirror in an essentially vertical plane about normal to the plane of the upper surface of the dresser, the combination therewith of a pair of vertically spaced brackets aligned with one of said standards and fixed to the back of said dresser, a second pair of vertically spaced brackets aligned with the other of said standards and fixed to the back of said dresser, each of said brackets comprising a base having a substantially rectangular body, spaced parallel side flanges extending from opposite edges of said body in a plane normal to the plane of said body, there being provided aligned apertures in said flanges, and a substantially U-shaped bridle for engaging and retaining one of said standards and having a transverse bit with a sharp inner edge adapted to engage and penetrate the wood of said standards, one of said standards being carried between said base and said bit of each bracket, the ends of said bridle extending inwardly through said aligned apertures.

3. In a mirror and dresser system of the class wherein a pair of spaced, wooden standards extends vertically along the back of the dresser beyond the upper surface of the dresser and is fixed to the back of the mirror at at least two spaced positions along the lengths of the standards, the standards being essentially rectangular in cross-section with their upper ends terminating at intermediate positions with respect to the back of the mirror so as to support the mirror in an essentially vertical plane about normal to the plane of the upper surface of the dresser, the combination therewith of a pair of vertically spaced brackets aligned with one of said standards and fixed to the back of said dresser, a second pair of vertically spaced brackets aligned with the other of said standards and fixed to the back of said dresser, each of said brackets comprising a base having a flat substantially rectangular body, spaced parallel side flanges extending from opposite edges of said body in a plane normal to the plane of said body, there being provided aligned apertures in said flanges, a substantially U-shaped wire bridle for engaging and retaining one of said standards and having a transverse bit with a sharp inner edge adapted to engage and penetrate the wood of one of said standards, one of said standards being carried between said base and said bit of each bracket, said bit being curved inwardly, the ends of said bridle extending inwardly through said aligned apertures, and a limit stop on one of said ends of said bridle for precluding pivotal movement of said bridle upwardly beyond about a horizontal position.

4. In a mirror and dresser system of the class wherein a pair of spaced, wooden standards extends vertically along the back of the dresser beyond the upper surface of the dresser and is fixed to the back of the mirror at at least two spaced positions along the lengths of the standards, the standards being essentially rectangular in cross-section with their upper ends terminating at intermediate positions with respect to the back of the mirror so as to support the mirror in an essentially vertical plane about normal to the plane of the upper surface of the dresser, the combination therewith of a pair of vertically spaced brackets aligned with one of said standards, a second pair of vertically spaced brackets aligned with the other of said brackets, each of said brackets comprising a base having a flat substantially rectangular body, spaced parallel side flanges extending from opposite edges of said body in a plane normal to the plane of said body, there being provided aligned apertures in said flanges, a substantially U-shaped bridle for engaging and retaining one of said standards and having a transverse bit with a sharp inner edge adapted to engage and penetrate the wood of said standards, one of said standards being carried between said base and said bit of each bracket, said bit being curved inwardly, the ends of said bridle extending inwardly through said aligned apertures, a limit stop on one of said ends of said bridle for precluding pivotal movement of said bridle upwardly beyond about a horizontal position, and prongs extending from said flanges and extending into the back of said dresser.

5. A mirror standard bracket including a base, means for securing said base to the back of a dresser, said base including a body piece having flanges extending therefrom, said flanges being provided with aligned apertures, and a pivotally mounted U-shaped bridle carried by said base, said U-shaped bridle having an edge adapted to engage and bite into the surface of a standard received between said body piece and said edge, said U-shaped bridle having end portions projecting through said apertures, said end portions being disposed on a side of said body opposite that of said edge.

6. A mirror standard bracket including a base, means for securing said base to the back of a dresser, said base including a body piece having flanges extending inwardly therefrom, said flanges being provided with aligned apertures, and a pivotally mounted bridle carried by said base, said bridle having an edge adapted to engage and bite into the surface of a standard received between said body piece and said edge, said bridle having end portions projecting through said apertures, said end portions being disposed on a side of said body opposite that of said edge.

7. A mirror standard bracket including a base, means for securing said base to the back of a dresser, said base including a generally rectangular body piece having flanges extending in one direction from opposite edges therefrom, said flanges being provided with aligned apertures, and a pivotally mounted U-shaped bridle carried by said base, said U-shaped bridle having a transverse bit parallel to said body piece with a sharp inner edge adapted to engage and bite into the surface of a standard received between said body piece and said edge, said U-shaped bridle having end portions projecting through said apertures, said end portions being disposed on a side of said body opposite that of said edge.

8. A mirror standard bracket including a base, means for securing said base to the back of a dresser, said base including a generally rectangular body piece having flanges extending in one direction from opposite edges therefrom, said flanges being provided with aligned apertures, and a pivotally mounted U-shaped bridle carried by said base, said U-shaped bridle having a transverse bit parallel to said body piece with a sharp inner edge adapted to engage and bite into the surface of a standard received between said body piece and said edge, said U-shaped bridle having end portions projecting through said apertures, said end portions being disposed on a side of said body opposite that of said edge, and means for restraining pivotal movement of said bridle.

References Cited in the file of this patent

UNITED STATES PATENTS

| Number | Name | Date |
|---|---|---|
| 901,158 | Dettmann | Oct. 13, 1908 |
| 1,206,655 | Belcher | Nov. 28, 1916 |
| 1,299,176 | Hadler | Apr. 1, 1919 |
| 1,584,105 | Lenz | May 11, 1926 |
| 1,778,255 | Frost | Oct. 14, 1930 |
| 1,926,994 | De Boer | Sept. 12, 1933 |
| 2,598,531 | Garrett | May 27, 1952 |
| 2,600,578 | Royer | June 17, 1952 |